United States Patent [19]

Saito

[11] Patent Number: 4,522,684
[45] Date of Patent: Jun. 11, 1985

[54] ELEVATIONAL OPERATING DEVICE FOR A ROTARY EVAPORATOR

[75] Inventor: Tatsuhiko Saito, Machida, Japan

[73] Assignee: Yamato Scientific Co., Ltd., Japan

[21] Appl. No.: 519,039

[22] Filed: Aug. 1, 1983

[30] Foreign Application Priority Data

| Oct. 15, 1982 | [JP] | Japan | 57-155089[U] |
| Oct. 15, 1982 | [JP] | Japan | 57-155091[U] |
| Oct. 15, 1982 | [JP] | Japan | 57-155092[U] |
| Feb. 10, 1983 | [JP] | Japan | 58-17465[U] |
| Feb. 10, 1983 | [JP] | Japan | 58-17466[U] |

[51] Int. Cl.³ .............................................. B01D 1/30
[52] U.S. Cl. .................................. 159/11.2; 159/25.1; 422/99
[58] Field of Search ................ 159/11 R, 11 A, 25 R, 159/25 A, 6 R, 113 A, 9 R, 9 A; 422/109, 99, 422/101; 248/125, 656; 254/DIG. 2, 103; 269/60

[56] References Cited

U.S. PATENT DOCUMENTS 4,276,260  6/1981  Drbac et al. ........................ 422/100

OTHER PUBLICATIONS

VWR Scientific Inc.; Scientific Apparatus Catalog 80; pp. 465 & 466; 1980.
Sargent-Welch Scientific Co.; Catalog; pp. 471–473; 1971.

Primary Examiner—Frank Sever
Attorney, Agent, or Firm—Jones & Askew

[57] ABSTRACT

An elevational operating device for a rotary evaporator comprises a pole, an elevating member which rotatably supports a sample vessel and which is mounted at its base portion to the pole to freely and vertically move, and an elevational operating pipe mounted in parallel with the pole to elevate the elevating member by the rotation of the pipe. The elevational operating device is by further provided a nut member adapted to be threadably inserted into the elevational operating pipe. The nut member is inserted into an inserting hole formed in said elevating member with a clearance for allowing a small and relative motion.

8 Claims, 3 Drawing Figures

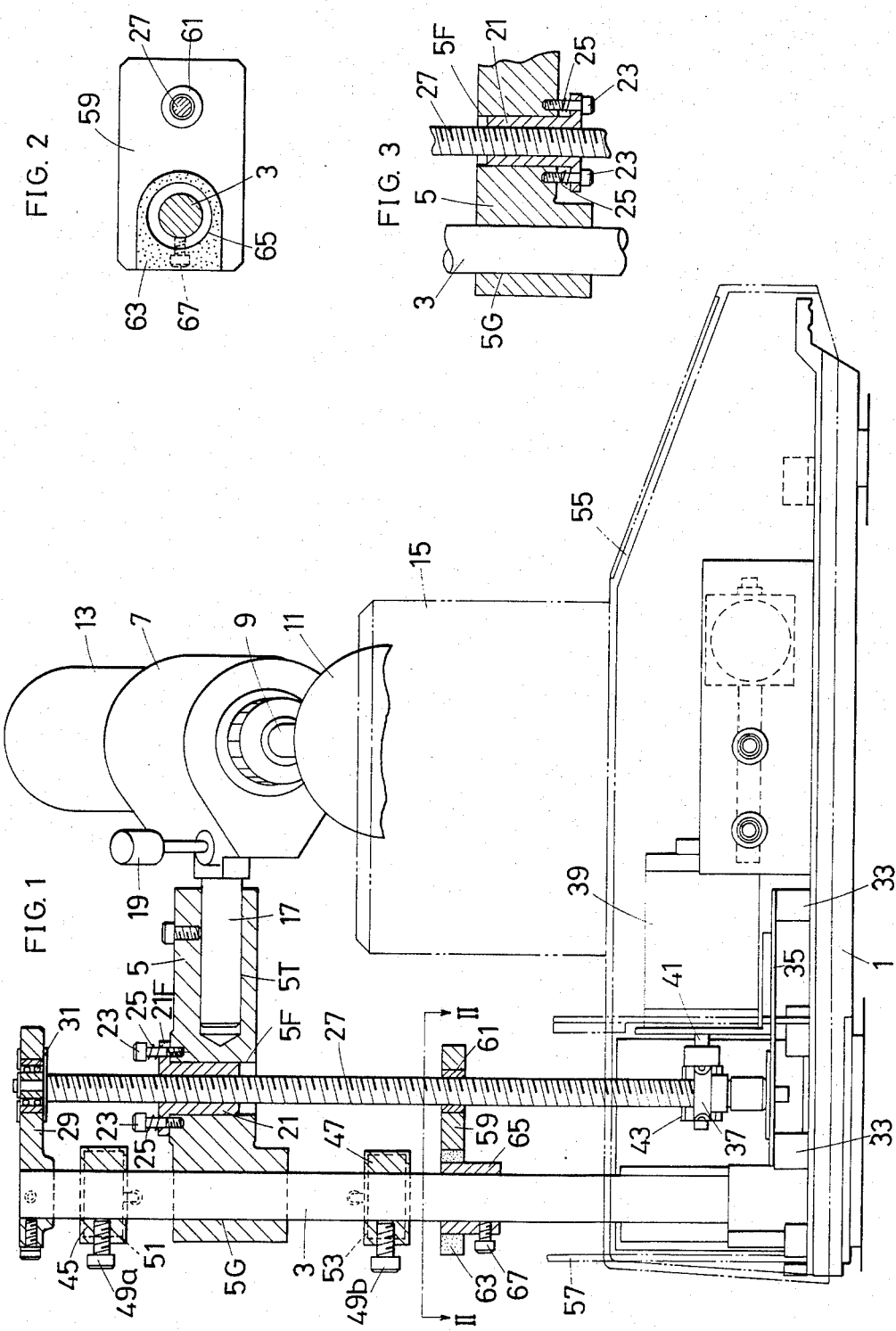

4,522,684

ELEVATIONAL OPERATING DEVICE FOR A ROTARY EVAPORATOR

BACKGROUND OF THE INVENTION

This device relates to an elevational operating device for a rotary evaporator in which an elevating member which supports a sample vessel or the like is elevationally supported to a pole which is almost vertically mounted on a base, this elevating member is threadably attached to an elevational operating pipe mounted in parallel with the pole, and the elevating member is vertically moved by the rotation of the pipe.

In an elevational operating device of this type, in the case where the base portion of the elevating member is elevationally attached to the pole and where the sample vessel and a heavy component such as a rotation driving apparatus or the like are attached to the end portion of the elevating member, the elevating member is supported to the pole so that it depends therefrom. Thus, an unbalanced load acts on the elevational operating pipe, and this will cause the pipe to curve slightly. Therefore, inconvenience will be caused in the engagement between the elevational operating pipe and the elevating member. Squeaking noise will be also generated. Hence, the elevating member may not be smoothly and vertically moved.

When the elevating member ascends, a large load will be applied to the pipe, so that inconvenience will be caused in the engagment between the elevational operating pipe and the elevating member. Squeaking noise may be generated and the elevating member may not be smoothly and vertically moved. At the moment when the pipe starts rotating when it elevates, a shock may be applied to the elevating member, so that the elevating member may largely vibrate. This will be an obstacle for the work and there is a risk of damage or the like of equipment.

SUMMARY

A object of the invention is to provide a elevational operating devise for a rotary evaporator in which elevating operations can be smoothly and vertically done.

Another object of the invention is to provide a elevational operating devise for a rotary evaporator in which no squeaking noise is produced when this devise operates.

BRIEF DESCRIPTION OF THE DRAWINGS

FIG. 1 is a front view showing an embodiment of the present device.

FIG. 2 is a horizontal cross sectional view taken along the line of II—II of FIG. 1.

FIG. 3 is a vertical cross sectional view showing the principal section in another embodiment.

DETAILED DESCRIPTION OF THE PREFFERED EMBODIMENTS

Referring to the Figures, the rotary evaporator according to this embodiment is constituted in such a manner that an elevating member 5 is vertically and elevationally supported to a pole 3 (refer to FIG. 3) vertically mounted on a base 1. A sample vessel 11 such as an eggplant-like flask or the like is removably attached to one end of a hollow rotary shaft 9 (refer to FIG. 4) of a rotation.driving apparatus 7 supported to this elevating member 5. A concentrator 13 is removably attached to the other end of the rotary shaft 9. A water bath 15 is provided to heat the sample vessel 11.

Next, each part will be described in detail; however, since the sample vessel 11 and the concentrator 13 are similar to those which will be generally used, their detailed explanation are omitted. Although the water bath 15 is not shown in detail in FIGS. 1–3, it is equipped with a heater to heat water and a temperature sensor to detect a water temperature. This heater is ON/OFF controlled by a control unit such as a microcomputer to always keep the water temperature in the water bath 15 to be a predetermined temperature.

A guide hole 5G is formed in the base portion of the elevating member 5, so that the elevating member 5 is vertically and slidably attached to the pole 3 mounted vertically on the base 1. The rotation driving apparatus 7 is supported to the end portion of the elevating member 5. A fitting hole 5T is further formed horizontally in the elevating member 5. The rotation driving apparatus 7 is rotatably or fixedly supported to a transverse shaft 17 which is inserted and fixed into the fitting hole 5T. Hence, the rotation driving apparatus 7 can be revolved (inclined) around the transverse shaft 17 by loosening a lever 19 provided for the rotation driving apparatus 7. The rotation driving appartus 7 can be integrally fixed to the transverse shaft 17 by fastening the lever 19. Therefore, an angle of inclination of the sample vessel 11 or the like can be adjusted by appropriately revolving and fixing the rotation driving apparatus 7.

An inserting hole 5F is vertically formed almost near the central portion of the elevating member 5. A nut member 21 with a flange 21F is loosely inserted into this inserting hole 5F. In other words, a small clearance is provided between the inserting hole 5F and the nut member 21 for allowing a small relative motion between the nut member 21 and the elevating member 5. A plurality of bolts 23 are integrally fitted to the elevating member 5 by loosely piercing through the flange 21F of the nut member 21. Spring members 25 such as a coil spring are interposed between the heads of the bolts 23 and the flange 21F. In this embodiment, the nut member 21 is inserted into the inserting hole 5F from the bottom to the upper portion; however, it may be inserted from the top.

The nut member 21 threadably fitted to an elevational operating pipe 27 provided in parallel with the pole 3. The upper end portion of this elevational operating pipe 27 is rotatably supported through a bearing 31 to a bracket 29 fixed to the upper end portion of the pole 3 by means of a plurality of bolts or the like. The lower end portion of the pipe 27 is also rotatably supported to a subbase 35 supported to the base 1 through a plurality of cushioning members 33 such as elastic rubber. Hence, the lower end portion of the elevational operating pipe 27 an freely, slightly and horizontally move.

A worm gear 37 is integrally fixed near the lower end portion of the elevational operating pipe 27. This worm gear 37 always engages a worm 43 which is integrally formed on an output shaft 41 of a motor 39 for rotation in the forward/reverse directions mounted on the subbase 35. Hence, the elevational operating pipe 27 will forwardly or reversely rotate by suitably driving the motor 39 for rotation, thereby causing the elevating member 5 to move vertically along the pole 3.

The rotation driving apparatus 7 is attached to the end portion of the elevating member 5. Thus, in FIG. 2, the portion near the central portion of the vertical elevational operating pipe 27 intends to curve and protrude slightly toward the left direction. However, this curve of the elevational operating pipe 27 will be prevented since the subbase 35, which supports the lower end portion of the elevational operating pipe 27, slightly move to the left in FIG. 3 and a small relative deviation occurs due to a loose engagement between the nut member 21 and the elevating member 5. In other words, the lower end portion of the elevational operating pipe 27 slightly moves to the left in FIG. 3, so that the pipe 27 inclines. However, since the nut member 21 is loosely inserted into the elevating member 5, the nut member 21 slightly inclines against the elevating member 5. Therefora, there will be no inconvenience in the engagement between the nut member 21 and the elevational operating pipe 27. Hence, the elevating member 5 can smoothly and vertically move by rotation of the elevational operating pipe 27, this will not produce squeaking noise.

As described above, when the elevating member 5 vertically moves along the pole 3 with the rotation of the motor 39, the upper and lower limits are arbitrarily set by an upper limit setting device 45 and a lower limit setting device 47 which are attached to the upper and lower end portions of the pole 3 for free adjustment of the location. The upper and lower limit setting devices 45 and 47 are fixed to the pole 3 by means of fixing members 49a and 49b such as a bolt, and the respective devices 45 and 47 are provided with sensing devices 51 and 53 such as a limit switch, respectively. Therefore, when the respective sending devices 51 and 53 operate by an ascent or descent of the elevating member 5, it is possible to set the upper and lower limits of the elevating member 5 by stopping the rotation of the motor 39. Thus, the sample vessel 11 can be always set to a fixed location against the water bath 15, thereby preventing vain overelevation of the elevating member 5.

As described above, the motor 39 is stopped by means of the sensing devices 51 and 53; however, it is not limited to such devices. It may also be possible to stop the motor 39 in such a manner that when the load of the motor 39 changes due to contact of the elevating member 5 with the upper limit setting device 45 or the lower limit setting device 47, a change in load of this motor 39 is detected.

The motor 39 or the like are loaded in a casing 55 and the pole 3 or the like are contained in a cover 57.

A supporting member 59 is fixed to a proper location of the pole 3, and a bearing pipe 61 which is pressure-inserted into one end portion of the supporting member 59 is rotatably attached onto the circumference of the pipe 27. A fixed pipe 65 is thermally fixed to the other end portion of the supporting member 59 through a rubber cushioning member 63. The fixed pipe 65 is slidably attached onto the circumference of the pole 3 and fixed by means of a screw 67 to the location where it will be most effective to prevent the vibration. The vibration due to the curve of the pipe 27 is absorbed by the cushioning member 63 of the supporting member 59 which supports the pipe, so that the vibration of the sample vessel 11 or the like is prevented.

With such a structure, an angle of inclination of the rotation driving apparatus 7 is properly set by operating the lever 19 in accordance with the size of the sample vessel 11 to be used, and the vertical locations of the upper and lower limit setting devices 45 and 47 are suitably set. Thereafter, when the elevational operating pipe 27 is revolved forwardly by starting the motor 39, the elevating member 5 moves up and the motor 39 stops at the location where the upper limit setting device 45 operates, then the elevating member 5 stops ascending. As described above, when the elevating member 5 elevates and rests in the stop location, the sample vessel 11 may be removed from the rotation driving apparatus 7 or proper sample may be put in the sample vessel 11. Then, the rotation driving apparatus 7 is activated to rotate the sample vessel 11. On the other hand, when the elevational operating pipe 27 is revolved reversely by starting the motor 39, the elevating member 5 moves down and the sample vessel 11 enters the water bath 15. When the lower limit setting device 47 operates with the descent of the elevating member 5, the motor 39 stops and the elevating member 5 is positioned at its stop location.

As the sample vessel 11 is rotated and heated in the water bath 15, the sample in the sample vessel 11 will be evaporated to be concenrated. On one hand, the vapor will be concentrated in the concentrator 13.

As described above, when the elevating member 5 moves vertically by the rotation of the motor 39, in the case where the elevational operating pipe curves due to the action of unbalanced load on the elevating member 5, the curve is restricted by the supporting member 59 and the vibration is absorbed, so that the vibration of the sample vessel 11 or the like will be prevented and the elevating member 5 will be smoothly and vertically moved. Moreover, since the upper and lower limit locations of the elevating member 5 have been appropriately preset, it is possible to efficiently perform the concentration or the like repeatedly when it is performed the concentation or the like repeatedly when it is performed using the sample vessel 11 with the same capacity.

What is claimed is:

1. Apparatus for elevatably supporting the unbalanced load of a rotary evaporator sample vessel in vertically elevatable relation alongside the supporting apparatus, comprising:
   a pole substantially vertically mounted on a base;
   a elevating member mounted for free vertical movement on said pole;
   a rotatable operating rod substantially vertically mounted on said base in parallel relation to said pole;
   a nut member mounted on said elevating member and operatively engaging said operating rod so as to impart vertical movement to the elevating member in response to rotation of the operating rod;
   said elevating member including means to support a sample vessel in horizontal spaced relation to said operating rod, whereat the weight of the sample vessel acts as an unbalanced load on the operating rod; and
   means designed for substantially precluding vibration and squeaking of said elevatable support apparatus while supporting an unbalanced load, including means operatively associated with said nut member and said elevating member to allow the nut member to undergo a limited amount of vertical motion reltive to the elevating member as the operating rod rotates.

2. Appparatus as in claim 1, wherein said nut member is mounted on said elevating member in a hole coaxial with said operating rod and with sufficient clearance from the elevating member to allow said relative vertical movement; and further comprising resilient means disposed between said nut member and said elevating member to undergo a limited amount of elastic deformation when the nut member commences said elevation, so as to cushion the mechanical shock and vibration.

3. Apparatus as in claim 2, wherein:

said operating rod has a lower end rotatably supported on a subbase which is supported by said base;

motive means mounted on said subbase and operative to rotate said operating rod so as to raise or lower the elevating member and sample flask; and elastic means connecting said subbase to said base so that said lower end of the operating rod can undergo a limited extent of radial movement with the subbase when an unbalanced load acting on the operating rod causes the operating rod to curve while rotating, whereby the limited radial movement of said lower end and the subbase accommodates dislocations at the lower end of the operating rod as the limited movement between the nut member and elevating member accommodates operating rod dislocation at the elevating member, caused by an unbalanced load acting on the operating rod.

4. Apparatus as in claim 3, wherein: said operating rod has an upper end rotatably mounted in fixed relation to said pole so that the radial dislocations of the operating rod caused by the unbalanced load will occur at the elevating member or at the lower end, where such dislocations are accommodated.

5. Apparatus as in claim 2, further comprising:

supporting means fixedly attached to said pole and circumferentially engaging an adjacent portion of said rotatable operating rod in a fixed spaced apart relation to the pole; and said circumferential engagement by the supportinq means permitting free rotation of the operating rod yet restraining said adjacent portions of the operating rod from radial displacement caused by curvature of the operating rod due to the unbalanced load acting thereon.

6. Apparatus as in claim 5, further comprising:

resilient means interposed between said supporting means and said pole to absorb vibration from the rotating operating rod.

7. Apparatus as in claim 2, further comprising:

an upper limit setting device for setting the upper limit location of said elevating member;

a lower limit setting device for setting the lower limit location of said elevating member;

both of said upper and lower limit setting devices being mounted to said pole so as to freely adjust the upper and lower vertical location limits of the elevating member; and motor for rotation of said operating rod and operative for being stopped after the vertical location of said elevating member has arrived at said upper or lower limit setting device.

8. Apparatus for elevatably supporting the unbalanced load of a sample vessel in vertically elevatable relation alongside the supporting apparatus, comprising:

a pole substantially vertically mounted on a base;

a elevating member mounted for free vertical movement on said pole;

a rotatable operating rod substantially vertically mounted on said base in parallel relation to said pole;

a nut member mounted on said elevating member and operatively engaging said operating rod so as to impart vertical movement to the elevating member in response to rotation of the operating rod;

said elevating member including means to support a sample vessel in horizontal spaced relation to said operating rod, whereat the weight of the sample vessel acts as an unbalanced load on the operating rod; and means designed for substantially precluding vibration and squeaking of said elevatable support apparatus while supporting an unbalanced laod, including supporting means fixedly attached to said pole and circumferentially engaging an relation to said pole; and said circumferential engagment by the supporting means being operative to permit free rotation of the operating rod but restricting radial displacement of said adjacent region of the operating rod caused by the unbalanced load acting thereon.

* * * * *